US010845109B2

(12) United States Patent
Echols

(10) Patent No.: US 10,845,109 B2
(45) Date of Patent: Nov. 24, 2020

(54) MODULAR ADIABATIC PRE-COOLING CASSETTE WITH METHOD OF RETROFIT FOR HORIZONTAL AIR-COOLED COMMERCIAL REFRIGERATION CONDENSERS

(71) Applicant: CoVAP LLC, Dawsonville, GA (US)

(72) Inventor: James D. Echols, Dawsonville, GA (US)

(73) Assignee: CoVAP LLC, Dawsonville, GA (US)

( * ) Notice: Subject to any disclaimer, the term of this patent is extended or adjusted under 35 U.S.C. 154(b) by 92 days.

(21) Appl. No.: 16/016,266

(22) Filed: Jun. 22, 2018

(65) Prior Publication Data

US 2018/0372387 A1    Dec. 27, 2018

Related U.S. Application Data

(60) Provisional application No. 62/523,281, filed on Jun. 22, 2017.

(51) Int. Cl.
| | | |
|---|---|---|
| F25B 49/00 | (2006.01) |
| F25B 49/02 | (2006.01) |
| F24F 5/00 | (2006.01) |
| F28C 3/08 | (2006.01) |
| F25B 39/04 | (2006.01) |
| F24F 11/70 | (2018.01) |
| F24F 110/22 | (2018.01) |
| F24F 110/12 | (2018.01) |
| F28D 5/02 | (2006.01) |
| F28D 21/00 | (2006.01) |
| F28B 1/06 | (2006.01) |

(52) U.S. Cl.
CPC .......... *F25B 49/027* (2013.01); *F24F 5/0035* (2013.01); *F24F 11/70* (2018.01); *F25B 39/04* (2013.01); *F28C 3/08* (2013.01); *F24F 2110/12* (2018.01); *F24F 2110/22* (2018.01); *F25B 2339/041* (2013.01); *F28B 1/06* (2013.01); *F28D 5/02* (2013.01); *F28D 2021/007* (2013.01)

(58) Field of Classification Search
CPC .. F25B 49/027; F25B 39/04; F25B 2339/041; F28D 5/02; F28D 5/00
See application file for complete search history.

(56) References Cited

U.S. PATENT DOCUMENTS

| | | |
|---|---|---|
| 3,427,005 A | 2/1969 | Kuykendall |
| 3,913,345 A | 10/1975 | Goettl |
| 4,212,172 A | 7/1980 | Manno |
| 4,338,266 A | 7/1982 | Flower |
| 4,353,219 A | 10/1982 | Patrick, Jr. |

(Continued)

*Primary Examiner* — Larry L Furdge
(74) *Attorney, Agent, or Firm* — Merchant & Gould P.C.

(57) ABSTRACT

According to another aspect, the present disclosure relates to a system for modular adiabatic evaporative pre-cooling of a horizontal air-cooled commericial refrigeration condenser. The system includes an evaporative media with an air permeable construction. The evaporative media has a water absorbable construction. The system also has a water supply port for supplying the volume of water. The system also has a water distributer for distributing the volume of water supplied from the water supply port. The water distributer distributes the volume of water to the evaporative media. The system also includes a water drain port for draining the volume of water distributed to the evaporative media.

18 Claims, 6 Drawing Sheets

(56) References Cited

U.S. PATENT DOCUMENTS

| | | | |
|---|---|---|---|
| RE31,360 E | | 8/1983 | Manno |
| 4,612,778 A | | 9/1986 | Medrano |
| 4,730,462 A | | 3/1988 | Rogers |
| 4,939,907 A | | 7/1990 | Taylor |
| 5,003,789 A | | 4/1991 | Gaona et al. |
| 5,226,293 A | | 7/1993 | Brock |
| 5,309,726 A | | 5/1994 | Asbridge |
| 5,325,681 A | * | 7/1994 | Ellis ............... F24F 5/0007 62/314 |
| 5,361,600 A | * | 11/1994 | Kelley ............ B01D 50/006 62/310 |
| 6,557,356 B2 | | 5/2003 | Underwood |
| 6,619,059 B1 | | 9/2003 | Johnson, Sr. |
| 7,080,519 B1 | | 7/2006 | Johnson, Sr. |
| 8,950,200 B2 | | 2/2015 | Townsend et al. |
| 10,132,577 B2 | | 11/2018 | Martell et al. |
| 2002/0176809 A1 | * | 11/2002 | Siess ................ B03C 3/00 422/121 |
| 2003/0000229 A1 | * | 1/2003 | Underwood ......... F24F 3/16 62/78 |
| 2004/0144110 A1 | * | 7/2004 | Reeves ............. A01K 1/0082 62/171 |
| 2011/0023506 A1 | | 2/2011 | Day et al. |
| 2012/0125027 A1 | * | 5/2012 | Echols ............. F25B 39/04 62/150 |
| 2013/0239803 A1 | | 9/2013 | Palmer |
| 2013/0276476 A1 | * | 10/2013 | Wong ............... F28F 25/04 62/513 |
| 2015/0027157 A1 | * | 1/2015 | Chou ............... F25D 17/042 62/271 |
| 2015/0292754 A1 | * | 10/2015 | Mongar ............. F24F 3/1417 62/94 |

\* cited by examiner

MODULAR ADIABATIC PRE-COOLING CASSETTE WITH METHOD OF RETROFIT FOR HORIZONTAL AIR-COOLED COMMERCIAL REFRIGERATION CONDENSERS

RELATED APPLICATIONS

The present application claims the benefit of U.S. Provisional Application No. 62/523,281 filed Jun. 22, 2017, the disclosure of which is considered a part of and incorporated herein by reference.

BACKGROUND OF THE INVENTION

1. Field of Invention

This invention relates to increasing the SEER (System Energy Efficiency Ratio) of an existing horizontal air-cooled condenser applicable to commercial refrigeration systems utilized in supermarket & commercial food service industries incorporating a system of modular evaporative pre-cooling cassette(s) to pre-cool and channel the ambient air prior to the air being pulled up and through the condenser coil slab thereby reducing the electrical consumption of the horizontal air-cooled condenser and the remote refrigeration compressor system designed for fresh food preservation in both low and medium temperature applications.

2. Description of Related Art

The vast majority of supermarket and foodservice facilities currently operating in the United States are equipped with horizontal air-cooled condensers that are integrated into a remote refrigeration system to facilitate condensing the vapor to liquid during the refrigeration cycle. The supermarket and food-service end-users have historically specified air-cooled condensers forgoing the reduced electrical demand associated with cooling towers based on the fact that an air-cooled condenser's service life is 15-20 years where a typical water cooled condenser's service life is 5-10 years. Supermarket and food service end-users have historically gravitated towards the air-cooled solution based on an air-cooled condenser's extended service life, the elimination of maintenance costs associated with water cooled condensing, and the fact that the initial cost of an air-cooled condenser is significantly less than that of a comparable water-cooled tower. In recent years, hybrid condenser designs that incorporate a factory installed evaporative pre-cooler on a vertically configured air-cooled condenser coil slab have been introduced into the industry, and are quickly gaining acceptance by supermarket and food-service end-users. The hybrid evaporative/air-cooled condenser design provides a significant energy efficiency gain during extreme temperature periods utilizing evaporative pre-cooling during summer ambient conditions, do not require water treatment reducing field maintenance, and have the equivalent service life of a standard air-cooled condenser. While the factory mounted evaporative pre-cooler solutions with a vertical condenser slab configuration provide an energy efficient solution for new or replacement air-cooled condenser installations, the hybrid vertical condenser solution does not address the hundreds of thousands of existing horizontal air-cooled condensers currently operating across the United States with only a few years' service into their 15-20 service life. The horizontal configuration of the condenser coil slab by design creates a significant issue for an evaporative pre-cooler module that incorporates evaporative media designed for installation in a vertical direction. Adding complexity to a retrofit application, air-cooled condensers are installed on various types of platforms including mechanical rooms, roofs, curbs, structural steel beams, and concrete slabs providing a significant obstacle with respect to channeling the ambient air across an evaporative pad and then up and through the horizontally mounted condenser slab utilizing the horizontally mounted condenser fan(s). Also, the variability in manufacturer designs with respect to the physical dimensions (length width height) of the air-cooled condensers, the spacing between the support legs, and field installed materials create additional obstacles for a cost effective evaporative pre-cooler retrofit solution.

SUMMARY OF THE INVENTION

The present disclosure is directed to field retrofit an existing horizontal air-cooled condenser regardless of the manufacturer brand or installation platform with an evaporative pre-cooler where the evaporative media is installed in a vertical configuration with an integrated air plenum creating an evaporative pre-cooler cassette for application to multiple fan air-cooled condensers with a horizontally configured condenser coil slab in both single row and double row condenser fan designs utilizing the existing condenser fans to pull ambient air through and across the evaporative cassette media and then up and through the horizontally mounted condenser slab. The invention is applied in a "by-fan bank" configuration incorporating an evaporative pre-cooler cassette per fan with each evaporative pre-cooler cassette containing a water pump, an evaporative medium, Ultra Violet LED bacterial spectrum sterilizer light, water distribution pan, water level sensing switch, and air flow sensing switch.

An example horizontal air-cooled evaporative pre-cooler retrofit system includes evaporative pre-cooler cassettes, common $H_2O$ supply solenoid with associated plumbing, and common drain solenoid with associated plumbing, and PLC (programmable logic controller).

To minimize the significant labor costs associated with creating large structures to encapsulate underneath an existing horizontal air-cooled condenser, the invention provides a flexible "one size fits all" method of installation where the evaporative cassettes are mounted by suspending the cassettes from the horizontal surface of the existing air-cooled condenser with metal strut providing a simple effective inexpensive means of retrofitting an existing horizontal air-cooled condenser while providing installation flexibility in both the vertical and horizontal directions. The upper metal strut is connected to the lower metal strut with threaded rods that when tightened "sandwich" the existing air-cooled condenser body between the upper and lower strut providing the invention structural rigidity. The invention incorporates a plenum assembly that is attached to the lower metal strut where the entire attachment assembly is installed without violating the integrity of the existing air-cooled condenser with screws, welding, or other means of permanent attachment. Once installed, the evaporative pre-cooler cassette is not permanently affixed to the existing horizontal air-cooled condenser therefore by design the invention is removable and reusable for future applications. The simple effective method of retrofit is critical to minimizing system installation costs providing a reduced capital expense for the end user providing an internal rate of return and return on invested capital necessary to justify the investment of retrofitting existing horizontal air-cooled condensers with an evaporative pre-cooler system.

In an exemplary embodiment, the invention incorporates an integrated air plenum design applied in a modular arrangement to channel air across the vertically configured evaporative media where pre-cooled air is then pulled up and through the horizontally configured condenser coil slab with a bypass air design to facilitate adjustment of the airflow across the evaporative media to maximize the efficiency of the evaporative media (approach to wet bulb temperature) while minimizing the additional work added to the existing fan motor associated with the added pressure drop through the evaporative medium.

In an exemplary embodiment, the evaporative pre-cooler cassette incorporates at least one $H_2O$ pump per fan with an integrated water sensing switch to eliminate the possibility of a pump operating in a dry condition thereby dramatically increasing the service life of the pump and eliminating the possibility of wasting electricity by energizing a pump when $H_2O$ is absent in the system.

In an exemplary embodiment, the evaporative pre-cooler cassettes incorporate an air-flow sensing switch integrated into each $H_2O$ pump whereby each $H_2O$ pump cycles independently from each other and the remote refrigeration system based on sensing air-flow generated by the individual fans on the existing horizontal air-cooled condenser further reducing the evaporative pre-cooler cassette's energy consumption, further increasing the service life of the individual $H_2O$ pump, and reducing water consumption ensuring water flowing across the evaporative media is suspended when condenser fans cycle on/off as controlled by the head pressure settings on the remote refrigeration system.

In an exemplary embodiment, the evaporative pre-cooler cassette sump water is constantly recirculating being pumped up and into a drip pan and then distributed evenly across the top of the evaporative media with a specific flow rate and distribution hole pattern designed to maintain a specific depth of $H_2O$ in the water distribution pan providing complete disinfection of bacteria in the water with the UV LED bacterial spectrum lighting system.

In an exemplary embodiment, the evaporative pre-cooler cassette system's sequence of operations, in order of operation, include energizing the evaporative pre-cooler system based on a real-time potential efficiency gain as calculated utilizing the basic Laws of Thermodynamics, where the potential pre-cooled dry bulb temperature approach to the current wet bulb temperature is calculated for the current ambient conditions allowing the owner/operator the ability to set the evaporative system's on/off set point for an efficiency gain adding the consumption of water through evaporation as a component of the evaporative system's on/off set point strategy allowing the owner/operator to balance water consumption and the potential compression system's efficiency gains providing intelligent control in areas that have water conservation measures in place. When the invention calls for pre-cooling mode, a normally open drain solenoid and the normally closed H2O supply solenoid are energized simultaneously providing pressurized city water to a common sump system to maintain a prescribed water level in each evaporative pre-cooler cassette where the common sump water level is maintained via mechanical float valves. When the pre-cooler cassette sumps reach a pre-determined level of water, the water level sensing switch engages a relay contactor energizing the H2O pump system and the UV LED bacterial spectrum sterilizer light system in each evaporative pre-cooler cassette. An air-flow sensing switch in each cassette cycles the H2O pump on/off based on sensing air-flow generated by the existing condenser fan in each individual fan chamber. The Evaporative pre-cooler system is de-energized based on the calculated minimum potential energy efficiency gain set point where the supply and drain solenoids return to a de-energized state of normally closed and normally open respectively.

The unique method of retrofit including not permanently attaching the evaporative pre-cooler cassette to the existing horizontal condenser using metal strut channel and threaded rods to create a simple effective flexible method of retrofit regardless of the original equipment manufacturer. The unique method for channeling the ambient air across the evaporative media and then through the condenser coil slab using an integrated plenum reducing the field installation labor and material increasing the end user's ROIC and IRR. The unique method of allowing an adjustable amount of ambient air to bypass the evaporative media to reduce pressure drop and control the associated increase of work on the existing fan motor. A unique method of managing the operation of the evaporative pre-cooling system using the Laws of Thermodynamics to calculate the potential energy efficiency gain of the refrigeration system at any given time balancing the potential energy gain against water usage. Modular concept of application with an evaporative pre-cooler cassette per fan bank with common sump system coupled with air-flow sensing switch saves energy and increases service life of pump by sensing through air flow when the condenser fan is cycled on/off by the refrigeration systems PLC. Water level sensing switch to ensure the system can never energize pumping system when water level is low or absent increasing pump service life and reducing energy usage. Distribution pan design for delivery of water to top of evaporative media with integrated bacterial spectrum UV LED allows simple effective bacteria eradication as the water is recirculated during the evaporative cycle eliminating the need for chemical water treatment and water waste by constantly "bleeding" of water from the system to maintain water quality.

According to another aspect, the present disclosure relates to a system for modular adiabatic evaporative pre-cooling of an existing horizontal air-cooled commericial refrigeration condenser. The system includes an evaporative media with an air permeable construction. The evaporative media has a water absorbable construction. The system also has a water supply port for supplying the volume of water. The system also has a water distributer for distributing the volume of water supplied from the water supply port. The water distributer distributes the volume of water to the evaporative media. The system also includes a water drain port for draining the volume of water distributed to the evaporative media.

According to another aspect, the present disclosure relates to a system for modular adiabatic evaporative pre-cooling of an existing horizontal air-cooled commericial refrigeration condenser. The system includes an evaporative media with a thickness and a planar geometry defined by a top end and a bottom end. The system also includes a plurality of water distribution ports configured in a balanced pattern to evenly distribute water to the top end of the evaporative media. The system also includes a water receiver configured to collect any of the water distributed to the evaporative media that exits from the bottom end of the evaporative media. The system also includes a pump assembly that removes water from the water receiver and recycles the water to the plurality of water distribution ports.

According to another aspect, the present disclosure relates to a system for modular adiabatic evaporative pre-cooling of an existing horizontal air-cooled commericial refrigeration condenser with a plenum and a fan. The system includes a water supply assembly, and an evaporative medium configured to be air permeable and water absorbent. The evaporative medium includes cellulose. The evaporative medium includes a generally planar geometry with an upper end and a lower end. The system also includes a water distribution assembly with an arrangement of ports to evenly distribute a volume of water from the water supply assembly to the upper end of the evaporative medium. The system also includes an ambient air sensor configured to monitor temperature and humidity. The ambient air monitor manipulates the volume of water supplied by the water supply assembly.

BRIEF DESCRIPTION OF DRAWINGS

The invention will be described in detail with reference to the following drawings in which like reference numerals refer to like elements and wherein.

DETAILED DESCRIPTION OF THE INVENTION

An economical solution for retrofitting an existing commercial horizontal air-cooled multi-fan refrigeration condensers with a modular adiabatic evaporative pre-cooling cassette system creating a hybrid evaporative/air-cooled design thereby significantly increasing the energy efficiency of the refrigeration system while minimizing maintenance and water use. The modular evaporative pre-cooler cassette incorporates an integrated plenum with adjustable bypass air design to channel ambient air through the vertically configured evaporative pre-cooler cassette, adiabatically pre-cool the ambient air as it flows across the evaporative media, mix the pre-cooled ambient air with the ambient bypass air, and then channel the pre-cooled air up and through the horizontal condenser coil slab in both single row and double row condenser fan designs utilizing the existing condenser fans for air movement. The modular evaporative pre-cooler cassette is mounted by suspending the apparatus from the horizontal surface of the existing air-cooled condenser with strut and threaded rods providing flexibility in both the horizontal and vertical direction facilitating a simple quick flexible installation. The apparatus utilizes water level and air flow sensing devices to maximize energy efficiency, significantly increase service life of water recirculating system, and minimize water consumption while controlling microorganism growth with bacterial spectrum LED light eliminating water treatment requirements.

Figure 1:
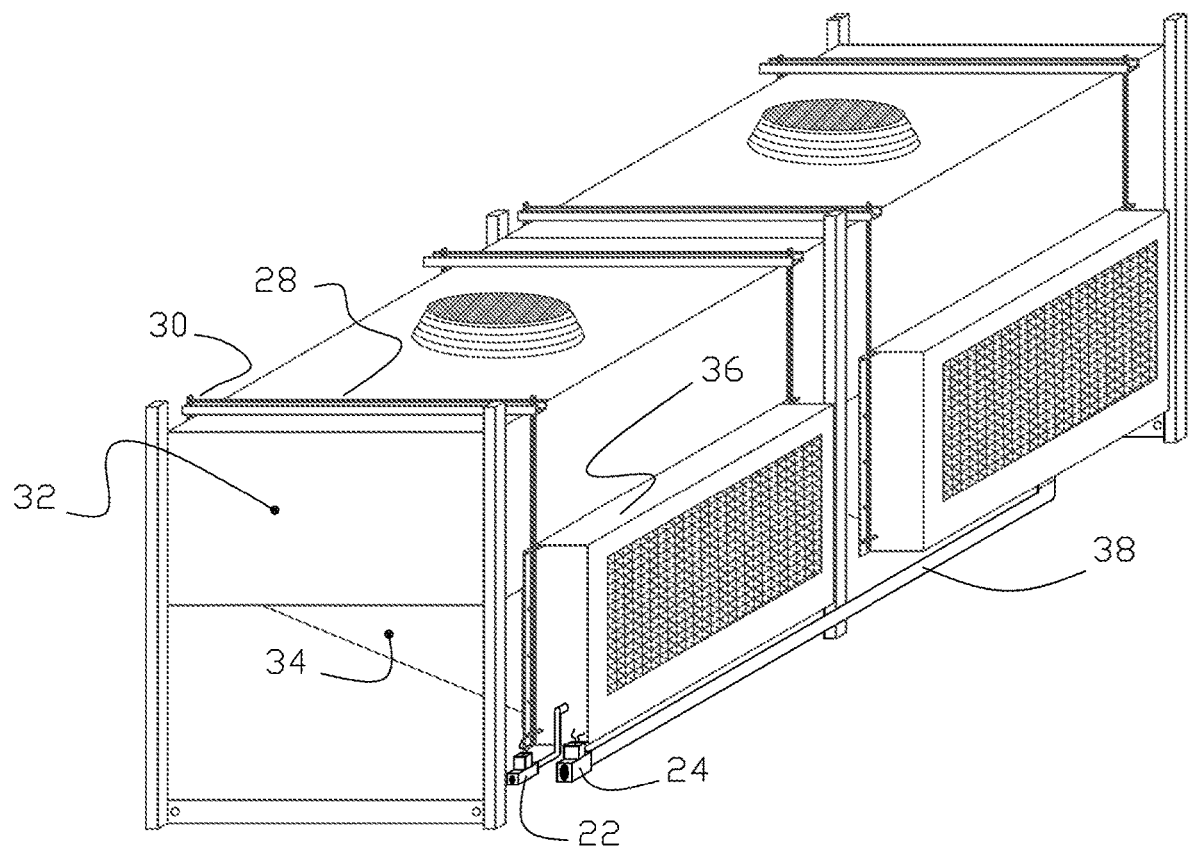
FIG. 1 is an isometric left side angle front view schematic diagram of apparatus illustrating, external components, connections, and overall housing design according to an embodiment of the present disclosure.

FIG. 1 shows an exemplary embodiment of the present invention retrofitted to an existing horizontal air cooled condenser 32 incorporating upper metal struts 28 with threaded rods 30 suspending multiple evaporative pre-cooler cassettes 36 from the horizontal top surface 32 of condenser. Air flow created by the existing condenser fan 40 is channeled by the integrated plenum 34 across the evaporative media of the evaporative pre-cooler cassettes 36 adiabatically pre-cooling the ambient air. The pre-cooled ambient air is then pulled up and through the coil of the existing horizontal air-cooled condenser 32 and discharged vertically into the atmosphere by the fan 40.

Figure 2:
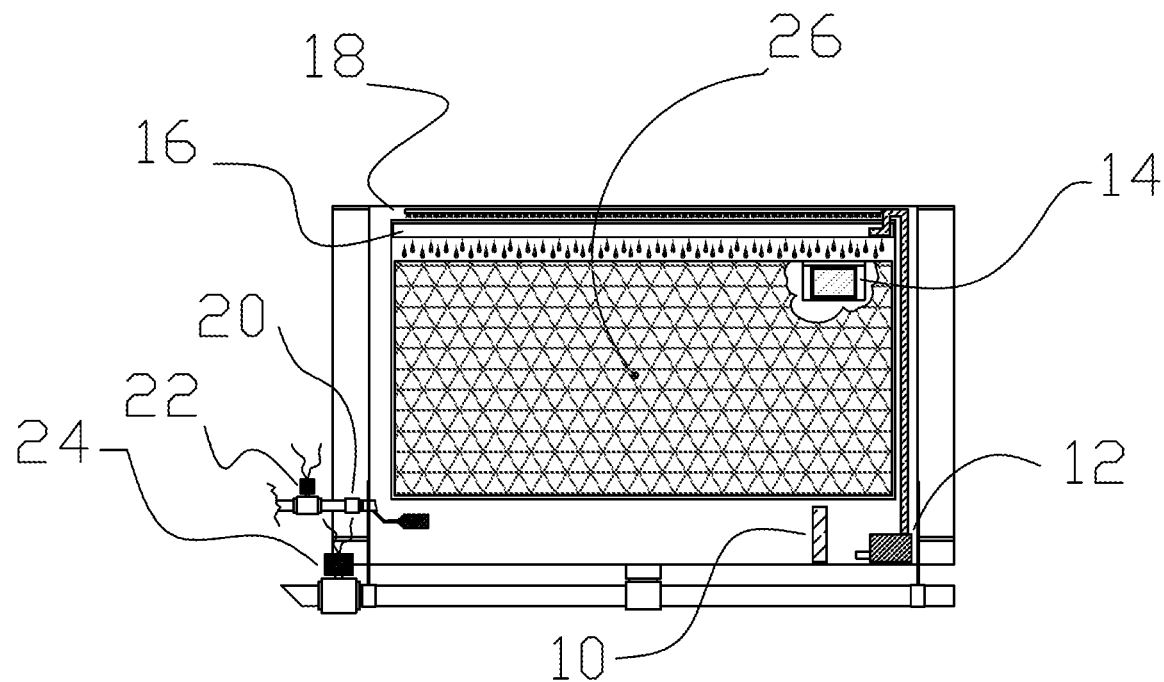
FIG. 2 is a front cut-away view schematic diagram illustrating elements of control switches, $H_2O$ recirculating system, and functional components shown in FIG. 1.

FIG. 2 shows an exemplary embodiment of the evaporative pre-cooler module and internal components. At a predetermined ambient temperature as controlled by a programmable logic controller, the evaporative pre-cooler cassettes are energized where the bacterial spectrum UV LED light 18 is energized, and the normally closed $H_2O$ supply solenoid 22 and the normally open drain solenoid 24 are energized where the evaporative pre-cooler sumps 36 and the PVC drain line 38 fill with water through the mechanical float valve 20. When the water level in the sump systems reaches a depth as predetermined by the location of the water level sensing switch 10, a contactor relay closes energizing the air-flow sensing switch 14, as the existing condenser fans cycle on and off, the individual recirculating pumps 12 are energized and de-energized based on air flow through the individual condenser fan chamber. When pump is energized, sump water is pumped up and into the $H_2O$ distribution pan 16 where the water is exposed to the bacterial spectrum LED light 18 disinfecting the sump water prior to being delivered to the top surface of the evaporative media 26. Water drains from the $H_2O$ distribution pan 16 at a specific flow rate as required delivering the exact amount of water flow to sufficiently soak the evaporative media 26 per manufacturer specifications. Non-evaporated $H_2O$ collects in the evaporative pre-cooled module sump and is recirculated until the ambient temperature reaches a predetermined set point where the programmable logic controller will de-energize the system retuning the supply 22 and drain 24 solenoids to normal state draining the sump system and shutting off the supply of water to the mechanical float valves 20. The water is supplied to the evaporative media 26 through the $H_2O$ Distribution Pan 16, for example via a plurality of apertures arranged in a pattern to evenly distribute the water across the thickness of the evaporative media.

Figure 3:
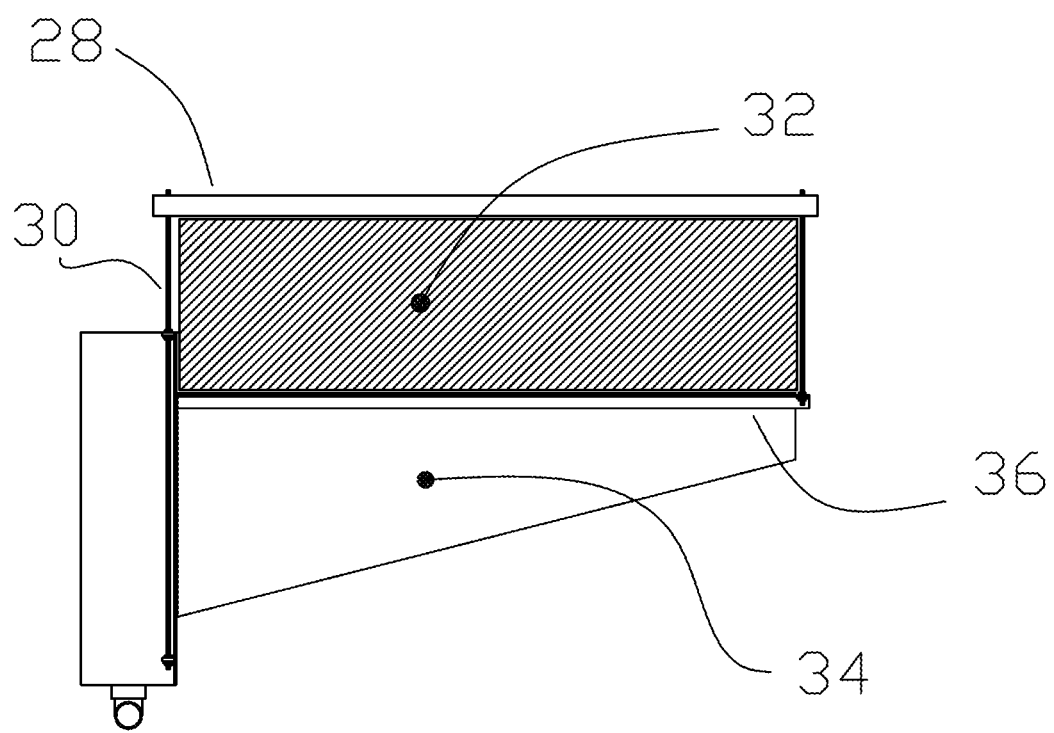
FIG. 3 is a side view schematic diagram of the apparatus illustrating the modular cassette design and mounting hardware utilizing the horizontal flat surface of the existing horizontal air-cooled condenser shown in FIG. 1.

FIG. 3 shows an exemplary embodiment for method of retrofit of an evaporative pre-cooler cassette to an existing horizontal air-cooled condenser. The evaporative pre-cooler cassette consists of the evaporative pre-cooler module 36 and associated components as previously described adding the integrated plenum 34 where ambient air is pulled through the evaporative pre-cooler media where it is adiabatically cooled with the pre-cooled ambient air subsequently pulled through the condenser coil slab by air-flow generated by the existing condenser fans. The method of retrofit includes an upper metal strut 28 to support the evaporative pre-cooler cassette, a lower metal strut 36, threaded rods, nuts 30, and lock washers facilitate an adjustable method of retrofit in both the vertical and horizontal directions to accommodate leveling the evaporative pre-cooled cassettes with other evaporative pre-cooler cassettes as required and to accommodate field installed piping for electrical connections while supporting the rear of the evaporative pre-cooler cassette with body of the existing air-cooled condenser 32 sandwiched between the upper 28 and lower 36 metal struts by tightening and securing nuts on the threaded rod.

Figure 4:
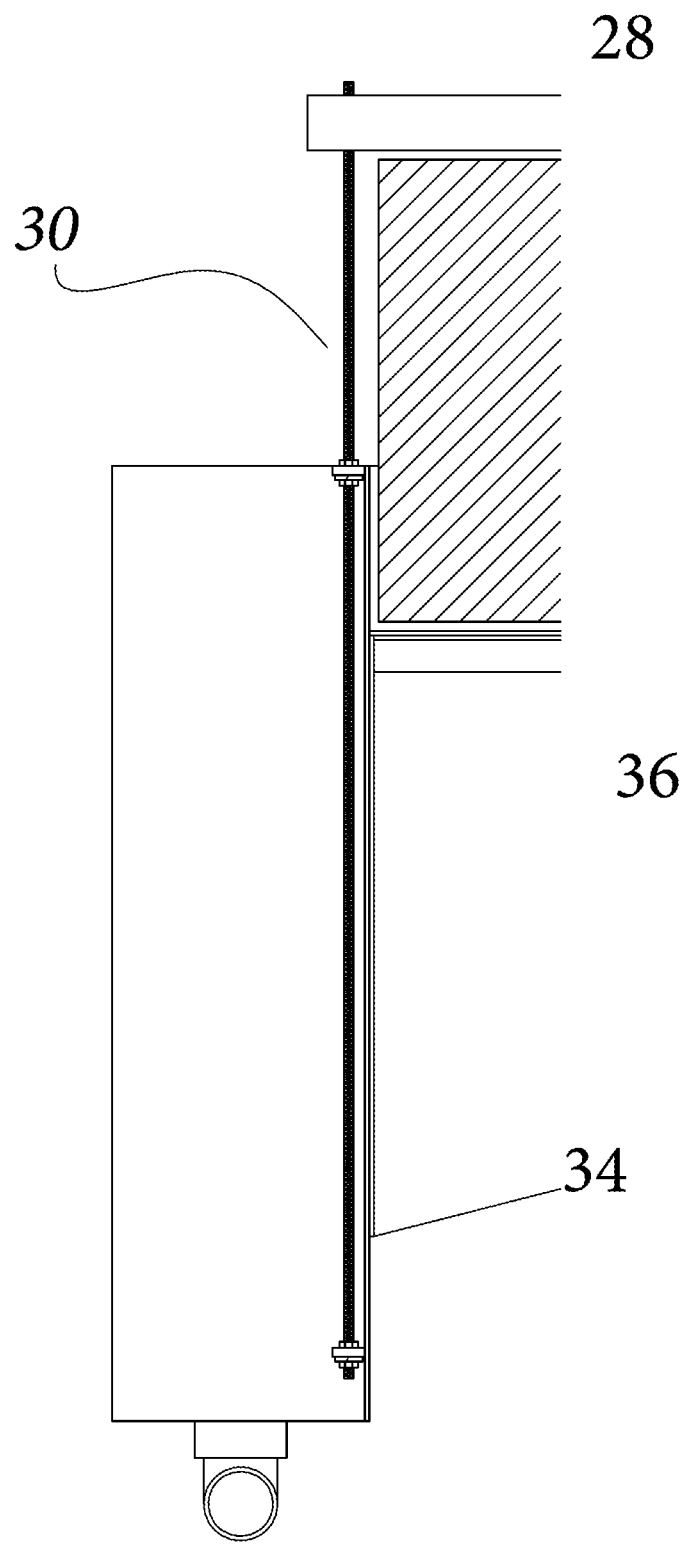
FIG. 4 is an enlarged view schematic diagram of strut and threaded rod method of retrofit shown in FIG. 1.

FIG. 4 shows an enlarged view of the threaded rod 30 and upper 28 and lower 36 strut assemblies on the module end of the evaporative pre-cooler module illustrating the adjustable nature of the method of retrofit.

Figure 5:
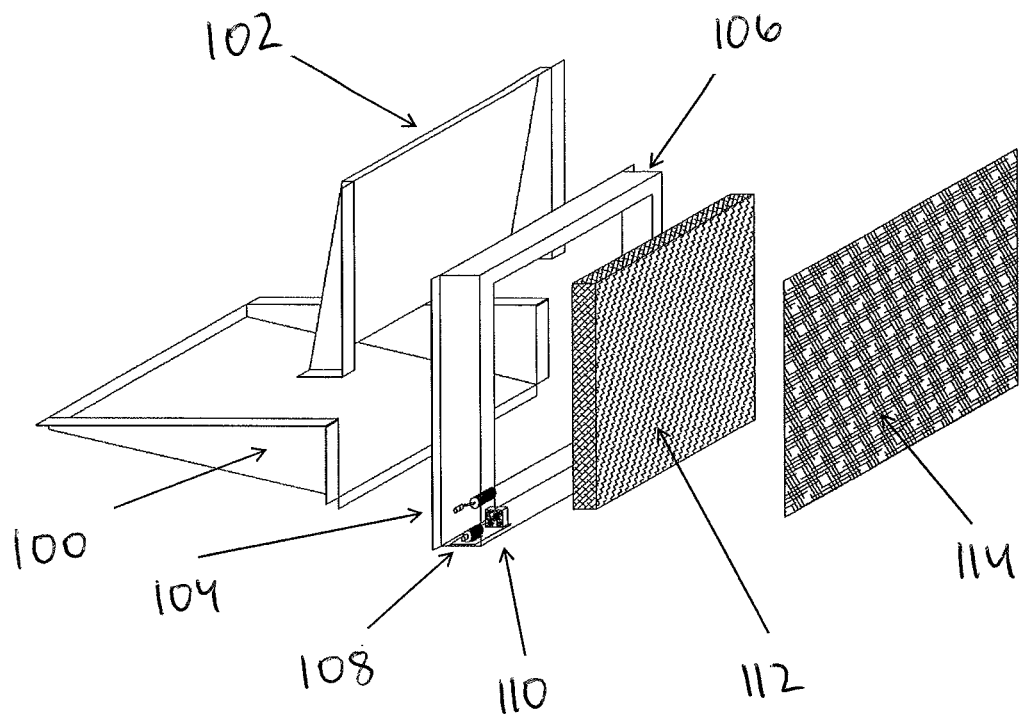
FIG. 5 is an exploded perspective schematic diagram of an example evaporative pre-cooler system according to an embodiment of the present invention.

FIG. 5 illustrates an example of the above described elements in an exploded schematic diagram to show the individual parts. The example shows two parts of a plenum, the lower part 100 and the upper part 102. The example includes a mechanical sump fill valve 104, similar to the $H_2O$ supply solenoid above. The example evaporative cooling media 112 is supported within a housing frame assembly 106. The example, includes an $H_2O$ pump 108, similar to the sump system drain solenoid above. The system includes an $H_2O$ level sensing switch 110 similar to the $H_2O$ sensing switch above. A two-layer pre-filter screen 114 can be included to protect the evaporative cooling media 112 secured within the housing 106. The housing or frame assembly 106 supports the evaporative media 112, the screen 114, the sump fill valve 104, the $H_2O$ pump 108 and the $H_2O$ level sensing switch 110.

Figure 6:
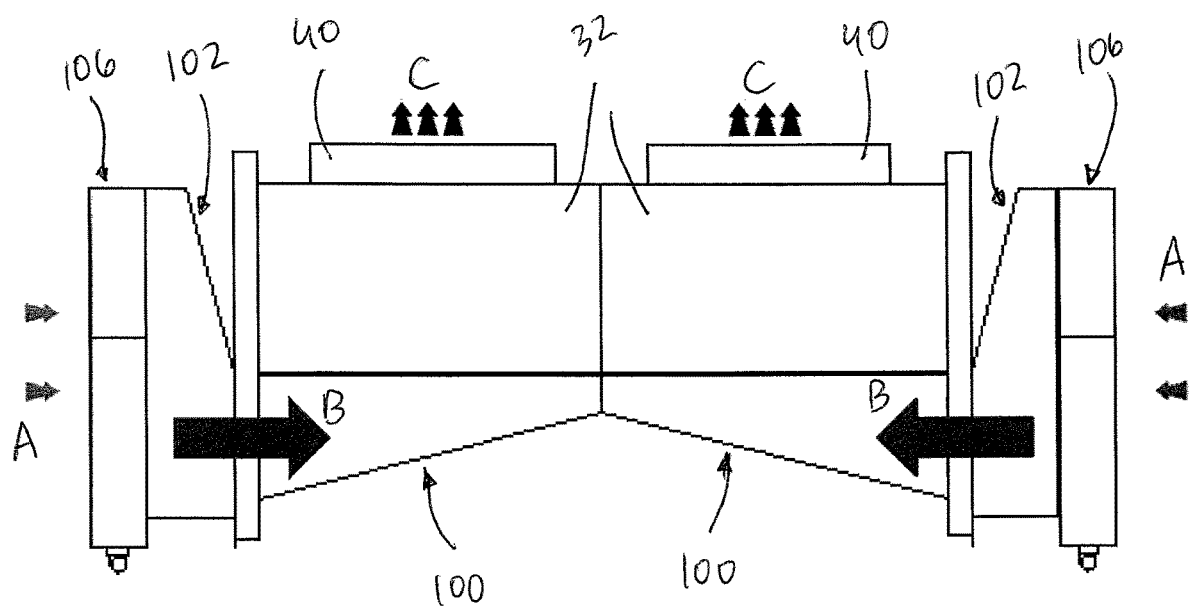
FIG. 6 is a schematic diagram of the air flow path through an example evaporative pre-cooler system according to an embodiment of the present invention.

FIG. 6 illustrates the direction of air flow through the system described above. Outside ambient air A is pulled through the evaporative media in the housing 106. The air B that passes through the evaporative media is directed by the upper plenum 102 into the lower plenum 100. The lower plenum 100 directs the air B up into the coils in the condenser 32. After passing through the coils in the condenser 32, the air C exits out into the atmosphere through the fan C. The fan C operates to pull the air through the entire process from its position at point A to point B, and to point C.

An example of the evaporative media 26, 112 discussed above, can be constructed of cellulose, for example a plurality of corrugated cellulose paper sheets with different flute angles, with one steep angle (30-60 degrees, preferably about 45 degrees), and one flat angle (10-20 degrees, preferably about 15 degrees) relative to the general planar axis of the assembly. The corrugated geometry allows for air flow therethrough. The evaporative material 26, 112 is water absorbable. An example of the evaporative material 26, 112 can have a thickness of between about 2-12 inches and preferably between about 4-8 inches. An example commercial embodiment of the evaporative material 26, 112 is CELdek®, specifically model 7060-15.

The embodiments described above can be manipulated by a control system with intelligent precooling control logic based on potential efficiency gain. This potential efficiency gain operates based on a consistent monitoring of the temperature and humidity in the ambient air. The temperature and humidity are compared with each other to determine the highest potential efficiency, and thus determine whether the above described systems operate or turn off. For example, if the ambient air is very humid, it may be less necessary to operate the above described system even if the temperature is very high. By contrast, if the temperature is very high but the humidity is low, it will be necessary for the above described systems to operate. The control system can also include a low ambient temperature cutoff, such that the system will not operate when it is cooler. There may also be a programmable $H_2O$ system purge control based on site water quality to ensure that the cleanest water is being used in the system.

PARTS NUMBERS

10 $H_2O$ Sensing Switch
12 Recirculating Pump
14 Air Flow Sensing Switch
16 $H_2O$ Distribution Pan
18 UV LED Bacterial Spectrum
20 Mechanical Float Valve
22 $H_2O$ Supply Solenoid
24 Sump System Drain Solenoid
26 Evaporative Media
28 Upper Strut Support
30 Threaded Rod
32 Existing Condenser Housing
34 Air Plenum
36 Lower Strut Support
38 Connecting PVC Piping
40 Fan
100 Plenum Lower
102 Plenum Upper
104 Mechanical Sump Fill Valve
106 Housing Frame Assembly
108 $H_2O$ Pump
110 Water Level Sensing Switch
112 Evaporative Cooling Media
114 Two-Layer Pre-Filter Screen

I claim:

1. A retrofit modular system for adiabatic evaporative pre-cooling of an existing air-cooled commercial condenser unit having one or more fans and a downward-facing horizontal inlet, the system comprising:
   a plenum structure including a vertical inlet and an upward-facing horizontal outlet, the upward-facing horizontal outlet being configured to cover at least a portion of the condenser unit downward-facing horizontal inlet;
   an evaporative media comprising an air permeable construction, the evaporative media comprising a water absorbable construction and being mounted to the plenum structure at the vertical inlet;
   a water supply port for supplying the volume of water;
   a water distributer for distributing the volume of water supplied from the water supply port, the water distributer distributing the volume of water to the evaporative media; and
   a water drain port for draining the volume of water distributed to the evaporative media.

2. The system of claim 1, wherein the evaporative media comprises cellulose.

3. The system of claim 1, wherein the evaporative media comprises a corrugated geometry configured to allow air to permeate therethrough.

4. The system of claim 1, wherein the water supply port comprises a fill valve.

5. The system of claim 1, further comprising one of a drain solenoid a pump.

6. The system of claim 1, wherein the water distributer comprises a plurality of ports arranged in a pattern to evenly distribute the volume of water to the evaporative media.

7. The system of claim 1, wherein the water distributer comprises a distribution pan configured to evenly distribute the volume of water to the evaporative media.

8. The system of claim 1, further comprising an ultraviolet light lamp to disinfect the volume of water in the water distributer.

9. The system of claim 1, further comprising a water level sensing switch in electronic communication with the water supply port to control the amount of additional water supplied to the water distributer.

10. The system of claim 1, further comprising an air flow sensor positioned to monitor the air flowing through the evaporative media.

11. The system of claim 1, wherein the water supply port is configured to supply a volume of water based on analysis of temperature and humidity in ambient air.

12. A system comprising:
- a commercial air-cooled condenser unit having one or more condenser coils, one or more fans, and a downward-facing horizontal inlet;
- a plenum structure mounted to and supported by the air-cooled condenser unit, the plenum structure including a vertical inlet and an upward-facing horizontal outlet, the upward-facing horizontal outlet being configured to cover at least a portion of the condenser unit downward-facing horizontal inlet;
- an evaporative media comprising a thickness and a planar geometry defined by a top end and a bottom end and being mounted to the plenum structure at the vertical inlet;
- a plurality of water distribution ports configured in a balanced pattern to evenly distribute water to the top end of the evaporative media;
- a water receiver configured to collect any of the water distributed to the evaporative media that exits from the bottom end of the evaporative media; and
- a pump assembly that removes water from the water receiver and recycles the water to the plurality of water distribution ports.

13. The system of claim 12, wherein the evaporative media comprises one or more of an air permeable construction, a water absorbent construction, and a plurality of corrugated cellulose sheets.

14. The system of claim 12, further comprising a housing that supports the evaporative media, the plurality of water distribution ports, the water receiver and the pump assembly, wherein the housing is configured to be retrofitted to an existing air-cooled condenser unit comprising a plenum.

15. The system of claim 12, further comprising a water level sensor positioned to determine the level of water in the water receiver.

16. The system of claim 12, wherein the plenum structure is mounted to and fully supported by the air-cooled condenser unit.

17. The system of claim 16, wherein the plenum structure is supported by an attachment assembly including one or more metal struts extending along a top surface of the condenser unit and one or more threaded rods operably connected to the plenum structure.

18. The system of claim 17, wherein the attachment assembly is secured to the condenser unit without the use of fasteners, welding, or other permanent attachment means such that the attachment assembly is removable from the condenser unit.

* * * * *